United States Patent [19]

Cookson et al.

[11] 4,164,243
[45] Aug. 14, 1979

[54] WELDED JOINT IN SEGMENTED SHEATH FOR COMPRESSED GAS INSULATED TRANSMISSION LINES

[75] Inventors: Alan H. Cookson, Southborough; Philip C. Bolin, Northborough, both of Mass.

[73] Assignee: Electric Power Research Institute, Inc., Palo Alto, Calif.

[21] Appl. No.: 779,124

[22] Filed: Mar. 18, 1977

[51] Int. Cl.² .................................................. F16L 9/02
[52] U.S. Cl. .................................... 138/162; 138/164; 138/171
[58] Field of Search ............... 138/162, 164, 166, 171; 285/286

[56] References Cited

U.S. PATENT DOCUMENTS

| | | | |
|---|---|---|---|
| 1,332,932 | 3/1920 | Sussman | 138/171 |
| 2,732,229 | 2/1956 | Gaum | 285/286 X |
| 3,508,766 | 4/1970 | Kessler et al. | 285/286 X |
| 3,704,901 | 12/1972 | Borner | 285/286 X |
| 3,864,507 | 2/1975 | Fox et al. | 174/16 B X |

*Primary Examiner*—Charles E. Phillips
*Attorney, Agent, or Firm*—Townsend and Townsend

[57] ABSTRACT

A weld-joint in a segmented sheath of a large diameter, high voltage, compressed gas insulated transmission line includes longitudinal, radially aligned outer margins forming a longitudinal seam of joined sheath sections, an internally disposed recess offset from the joined margins, a longitudinal tongue overlapping the joined outer margins and mating with the recess, and a longitudinal sealing gasket, preferably an elastomeric tube, disposed in the region between the tongue and the tongue-receiving recess. A hollowed cutaway section is provided within the joint and aligned with the radial margins to form an enclosed cavity. A longitudinal ridge is provided along the sealing gasket for spacing and protecting the gasket. The end of the tongue and the adjacent walls of the internally disposed recess form together a Vee grove for trapping loose particles internal of the tubular enclosure formed by the joined sheath sections. The enclosed cavity and sealing gasket promote a strong, full penetration weld along the seam.

7 Claims, 1 Drawing Figure

U.S. Patent  Aug. 14, 1979  4,164,243
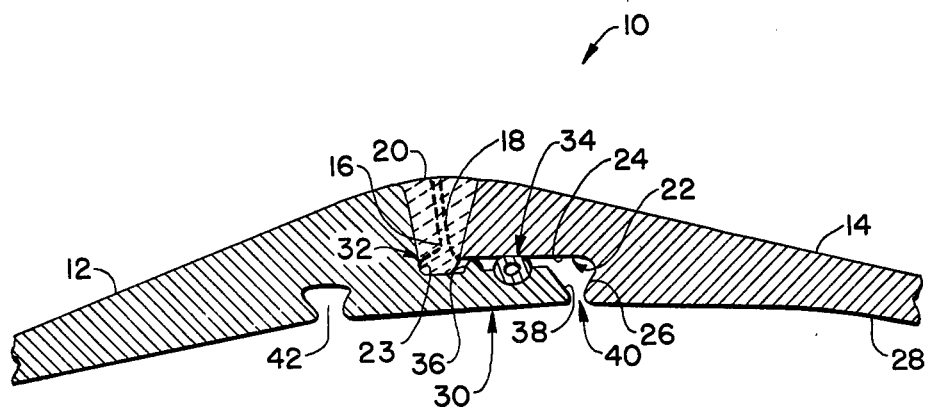
FIG._1.

WELDED JOINT IN SEGMENTED SHEATH FOR COMPRESSED GAS INSULATED TRANSMISSION LINES

This invention was made under contract for or supported by the Electric Power Research Institute, Inc.

BACKGROUND OF THE INVENTION

1. Field of the Invention

This invention relates to compressed gas insulated transmission lines for high voltage electric power applications and particularly to longitudinal seams between arcuate sheath sections for forming a sealed cable. 2. Description of the Prior Art In a typical compressed gas insulated transmission line (CGIT) system, a protective tubular sheath encloses and supports electrical conductors for power transmission. The sheath is filled with a gas, typically sulfur hexafluoride ($SF_6$) pressurized at about 50 psig.

The major cost of a CGIT line system lies in the fabrication of the sheath. A large diameter conduit is typically constructed of extruded aluminum and consists of a plurality of modular elongated arcuate sections which readily fit together. This construction technique has the advantage that large diameter sheaths, i.e., greater than 20 inches in diameter, can be constructed at a lower cost than comparable spiral welded or rolled and welded pipe, as has generally been required in prior art high voltage isolated phase or three conductor CGIT line systems.

Segmented tongue-in-groove weld joints are known to the art. For example, U.S. Pat. No. 3,864,507, to Fox et al., describes a single conductor cable having longitudinal tongue-in-groove weld joints, wherein the interior of the cable is protected from the weld area. A construction, such as the Fox et al. design, has a number of disadvantages. First of all, the tongue-in-groove configuration requires very accurate extrusions of the tongue and mating groove. Extrusions of suitable accuracy are difficult and relatively expensive, particularly in long sheath segments. Furthermore, it is also very difficult to align the tongue-in-groove joint of large diameter, long length, multiple segment sheaths. Still further, an exterior weld along the joint may not be reliably uniform and may therefore have weaknesses which could develop into undesirable cracks if the seam is strained.

Therefore, an improved joint is needed wherein alignment is simplified, the joint is sufficiently strong, and construction time and costs are minimized.

SUMMARY OF THE INVENTION

According to the invention, an improved weld-joint in a segmented arcuate sheath of a large diameter, high voltage, compressed gas insulated transmission (CGIT) line includes first and second longitudinal outer margins, each having an opposing face generally parallel with a radial line through a longitudinal axis at the center of curvature of the segmented sheath forming a longitudinal seam of joined sheath sections, an internally disposed recess offset from the joined margins and mating with an internal circumferentially extended tongue, and a longitudinal sealing gasket, preferably an elastomeric tube, disposed in the region between the tongue and the tongue-receiving recess. A hollowed cutaway section is provided within the joint and aligned with the radial margins to form an enclosed cavity. A longitudinal ridge is provided along the sealing gasket for spacing and protecting the gasket. The end of the tongue and the adjacent walls of the internally disposed recess form together a Vee groove for trapping loose particles internal of the tubular enclosure formed by the joined sheath sections. The enclosed cavity and sealing gasket promote a strong, full penetration weld along the seam.

A particular advantage of this invention over the prior art lies in the use of a cutaway section forming a cavity interior of the joined radial margin. This cavity promotes a full penetration weld without interference from any oxide layer which may be present. Oxidized layers at the weld area can be particularly detrimental, since poor welds may result in cracks which could subsequently propagate under stress.

A further advantage of an overlap joint, as opposed to a tongue-in-groove joint, is that the extrusion of the margin is significantly simplified. Extremely accurate tolerances are not required in order to maintain correct alignment, particularly in large diameter, long length sheaths utilizing the joint according to the invention.

A still further advantage lies in the use of an elastomeric sealing gasket, such as a silicone rubber seal in the overlap area between the tongue and the recess. The sealing gasket is effective to protect the interior of the cable against weld splatter during assembly. Weld splatter might subsequently cause high voltage breakdown within the cable. Moreover, with the sealing gasket located in an area offset from the welding site, the gasket is not in direct view of the arc during welding. Consequently it is unnecessary to use a protective layer in the seal region, as is frequently used to prevent arc-irradiation-induced vapor emission from the elastomeric material.

The spacing ridge along the seal gasket provides a number of useful advantages. First of all, the ridge further protects the sealing gasket against direct exposure to arc irradiation. Second, the ridge assists in the alignment of the joint by defining the spacing between mated sheath segments. Further, the ridge prevents overcompression of the sealing gasket, which might crush or unseat the gasket.

Another specific advantage over the tongue-in-groove type joint lies in the tolerance permitted between the circumferential tongue and mating recess. The open design, as compared to the tongue-in-groove type joint, specifically permits greater tolerance during the set-up operation, and thereby speeds construction.

The interior junction of the recess and the top of the circumferential tongue are used to still further advantage. This junction area forms a longitudinal Vee notch which may act as a particle trap for capturing undesired debris inside of the sheath.

As a still further advantage, the overlap type joint of the present invention permits easy alignment of the inner wall so that the desired circular configuration can be maintained throughout the length of the sheath for mounting conduits and spacers.

These and other advantages will be more apparent upon reference to the following detailed description taken in conjunction with the accompanying drawings.

BRIEF DESCRIPTION OF THE DRAWING

The single FIGURE is a cross-sectional view of a preferred embodiment of the present invention viewed along the longitudinal axis of joined elongate arcuate sheath segments.

DETAILED DESCRIPTION OF THE PREFERRED EMBODIMENT

In the FIGURE, an axial cross-sectional view of a CGIT cable joint 10 is shown which, longitudinally couples a first elongated arcuate sheath segment 12 and a second elongated arcuate sheath segment 14, which are preferably extruded aluminum members. The area of the joint 10 is preferably of a larger radial cross section than the normal cross section of the sheath wall, in order to assure that the joint 10 region contains adequate material to establish a reliable weld junction.

Each sheath segment 12 and 14 includes first and second margins 16 and 18 respectively, which are adapted to confront one another along the exterior longitudinal junction. The first and second margins 16 and 18 are adapted to be fused by a weld bead 20 drawn along the length of the joint 10 forming a seam. The weld bead 20 is typically formed by a conventional electric arc weld adapted to aluminum although other welding techniques may be employed.

On the interior side, the second sheath segment 14 forms an interiorly facing circumferential recess 22 which is offset laterally along the second margin 18. The recess 22 includes a base wall 24 and an overhanging sidewall 26 joining the base wall 24 to an interior wall 28 of segment 14. The first sheath segment 12 includes a tongue 30 which is adapted to overlap and substantially conform to the recess 22, forming a channel between the interior and exterior of the joint. The margins 16 and 18 are covered by the tongue 30 against direct exposure to the sheath interior.

According to one aspect of the invention, an enclosed longitudinal cavity 32 is formed by an overhang 23 within the joint interior which is in radial alignment with interior terminal portions of radial margins 16 and 18. The cavity 32 permits full penetration of the weld so that the seam of joint 10 is uniformly strong throughout its length. Absent a longitudinal cavity, layers of oxide that may be present in the weld area offer considerable resistance to the formation of a uniformly strong weld. The welding of aluminum is a particular problem, since aluminum oxidation, unless sufficiently suppressed, appreciably reduces weld strength.

A further feature of the invention lies in the protection of the sheath interior against weld splatter. For this purpose, a sealing gasket 34 is provided along the length of the joint 10 between the base wall 24 and the confronting tongue 30. The gasket 34 is preferably a tubular elastomeric material, such as silicone rubber. With the gasket 34 offset relative to the site of the weld bead 20, the gasket 34 is not directly in view of the arc during the welding process. Consequently, it is unnecessary to provide a protective layer such as fiberglass around the gasket 34, as is frequently used to prevent arc-irradiation-induced vapor emission.

As a further feature of the invention, a longitudinal ridge 36 is provided on the interior of tongue 30 between the cavity 32 and the gasket 34. The ridge 36 abuts the base wall 24 and assists in the alignment of the sheath segments during the initial assembly. Furthermore, the ridge 36 defines a minimum space between the tongue 30 and the base wall 24 of recess 22 so that the gasket 34 is not crushed or ejected under compression pressure from the tongue 30 and confronting base wall 24. Still further, the ridge 36 provides further protection to the gasket 34 against weld splatter.

The tongue 30 may be provided with a top end 38 tapered to overhang the base wall 24 and to confront the overhanging side wall 26, thereby defining a Vee notch which may serve as a particle trap 40. The particle trap 40 preferably has a relatively narrow neck and an enlarged interior cavity. Other longitudinal particle traps 42 may be provided adjacent the joint 10, or in other locations in the sheath interior, as desired.

The joint 10 is formed by bringing the sheath segments 12 and 14 together so that margins 16 and 18 abut one another with the tongue 30 confronting the recess 22, the ridge 36 assisting in alignment. With the sheath segments 12 and 14 so arranged, the margins 16 and 18 are butt-welded from the exterior to form a weld bead 20 fully penetrating to the cavity 32. Where an electric arc weld is employed, a weld angle of 60° is preferably employed.

The sheath segments are preferably fabricated by extruding mateable elongated arcuate aluminum segments wherein one longitudinal margin is provided with the tongue margin and the opposite longitudinal margin is provided with the recessed margin. Identical arcuate sections can thus be employed to form tubular sheath segments by merely aligning the complimentary margins and then butt-welding the exterior joint, such that the weld fully penetrates to the joint interior cavity.

An overlap weld joint as herein described enables relatively simple alignment and strong, full-penetration welding, particularly of aluminum. Moreover, a seal in the overlap region prevents the incursion undesired weld splatter into the sheath interior, which might otherwise cause high voltage failure in an operating line. The overlap joint has the additional advantage of establishing a convenient particle trap along the segment interior junctions.

The principles of the present invention have now been described and illustrated by specific embodiments, to which modifications, alternative arrangements of components and choices of variables may be apparent to those reasonably skilled in the art without departing from the invention. It is therefore intended that the invention not be limited except as provided in the appended claims.

We claim:

1. A weld joint in an arcuate segmented sheath of a compressed gas insulated transmission line for joining first and second sheath sections having interior and exterior walls along confronting longitudinal edges, said joint comprising:

a first longitudinal margin adjacent said exterior wall of said first second having a face generally parallel with a radial line through a longitudinal axis at the center of curvature of said segmented sheath;

a longitudinal recess offset from said first margin along said interior wall, said recess including a circumferential base wall;

a second longitudinal margin adjacent said exterior wall of said second section having a face generally parallel with a radial line through a longitudinal axis at the center of curvature of said segmented sheath to abut to said first margin;

a tongue extending circumferentially from said second section and having one face to confront to said face wall;

sealing means comprising a tubular elastomeric sealing gasket longitudinally disposed between said recess and said tongue; and, a longitudinal ridge adjacent said sealing gasket for preventing the flattening of said sealing gasket between said tongue and said recess.

2. A weld joint according to claim 1 wherein said recess includes a side wall overhanging said base wall and wherein said tongue includes a top margin facing said side wall to define a longitudinal particle trap in communication with said interior wall.

3. A weld joint according to claim 1 wherein said sealing gasket is a silicone rubber tube.

4. A weld joint according to claim 1 further including a resilient sealing means longitudinally disposed between said tongue face and said base wall for blocking weld splatter from said interior walls.

5. A weld joint according to claim 1 wherein said longitudinal ridge is disposed adjacent said sealing gasket for preventing the flattening of said sealing gasket between said tongue and said recess.

6. A weld joint according to claim 5 wherein said longitudinal ridge is disposed between said sealing gasket and said cavity for shielding said sealing gasket from a site of weld irradiation.

7. A weld joint according to claim 1 further including a stepped overhang at a junction between said second margin and said tongue to define a cavity in radial alignment with said first and second margins and in communication with a channel formed by said base wall and said tongue, and a full penetration butt weld along said first and second margins forming a longitudinal weld seam between said sheath sections.

* * * * *

UNITED STATES PATENT AND TRADEMARK OFFICE
CERTIFICATE OF CORRECTION

PATENT NO. : 4,164,243
DATED : August 14, 1979
INVENTOR(S) : ALAN H. COOKSON et al.

It is certified that error appears in the above—identified patent and that said Letters Patent is hereby corrected as shown below:

In the Abstract, line 16, change "grove" to --groove--.

In Claim 1, line 7, change "second" to --section--; and in line 20, change "face" to --base--.

Signed and Sealed this

Twelfth Day of August 1980

[SEAL]

Attest:

SIDNEY A. DIAMOND

Attesting Officer

Commissioner of Patents and Trademarks